(No Model.) 6 Sheets—Sheet 3.
W. T. HARRIS.
VEHICLE MOTOR.
No. 495,733. Patented Apr. 18, 1893.
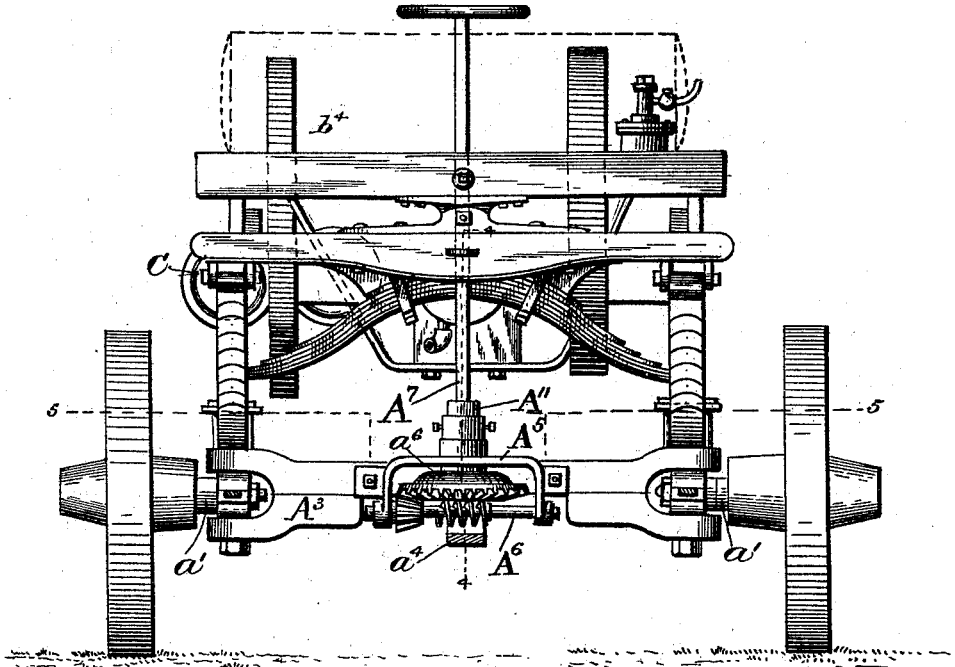
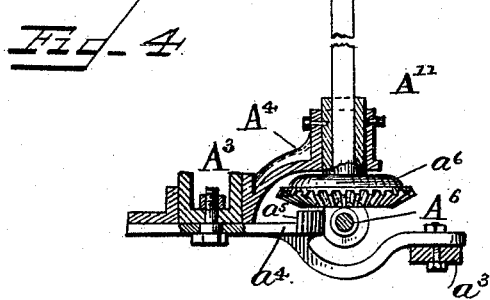
WITNESSES
F. L. Ourand
W. E. Schneider
INVENTOR
William T. Harris
per C. E. & W. Bradford
Attorneys (No Model.) 6 Sheets—Sheet 4.
W. T. HARRIS.
VEHICLE MOTOR.
No. 495,733. Patented Apr. 18, 1893.
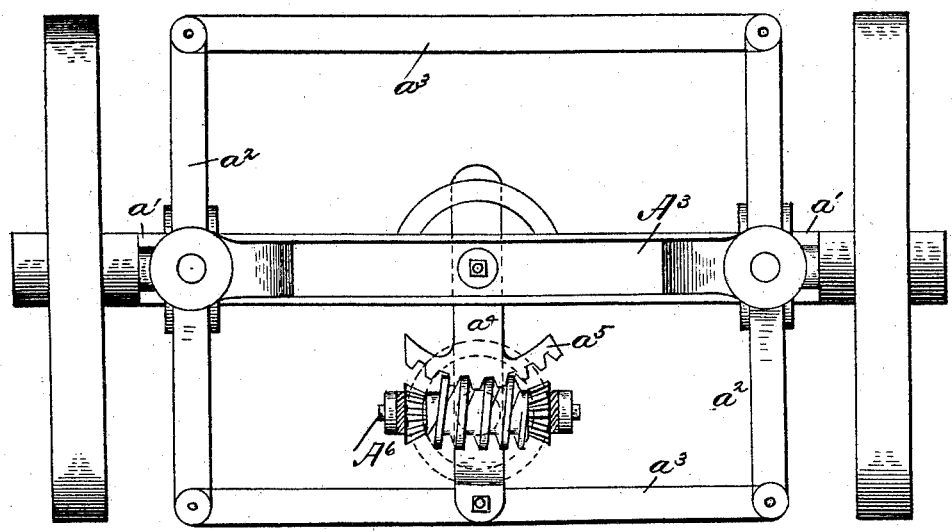
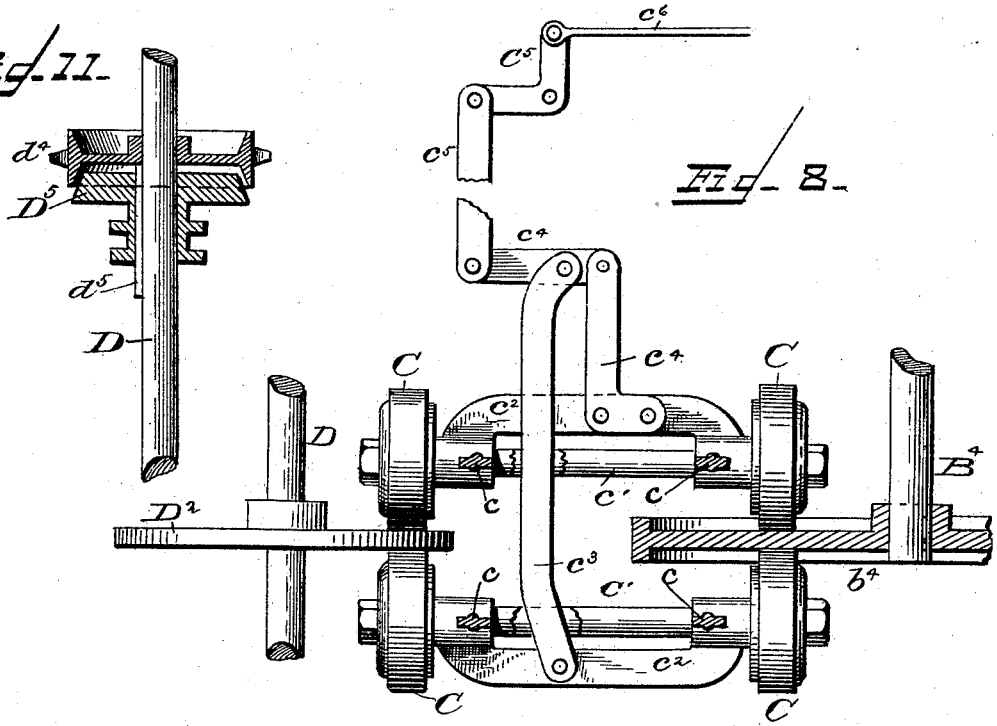
WITNESSES
F. L. Ourand
W. E. Schneider
INVENTOR
William T. Harris
per A. E. & W. Bradford
Attorneys (No Model.)  6 Sheets—Sheet 5.
W. T. HARRIS.
VEHICLE MOTOR.
No. 495,733.   Patented Apr. 18, 1893.
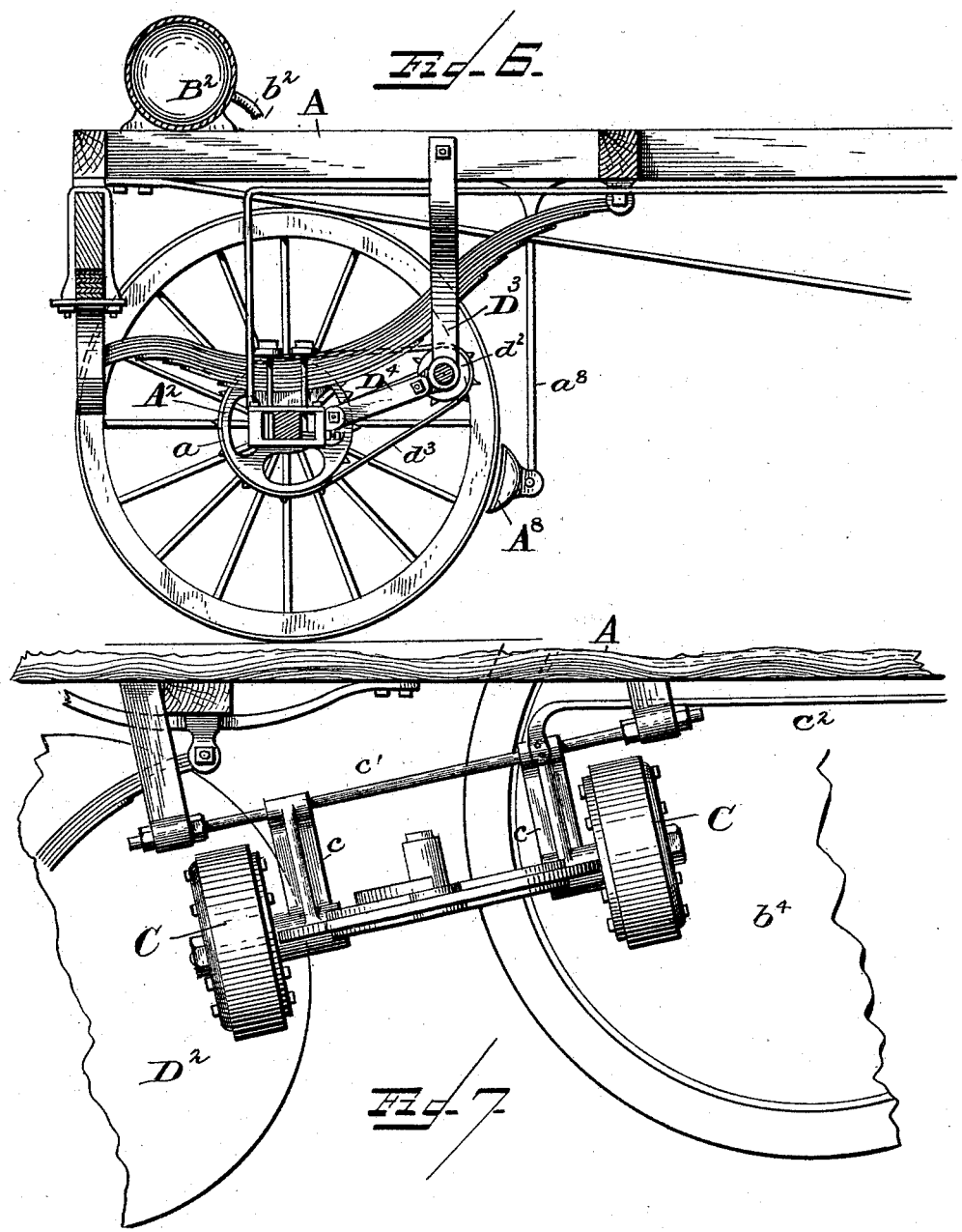
WITNESSES
F. L. Ourand
W. E. Schneider
INVENTOR
William T. Harris,
per C. W. Bradford,
Attorneys.

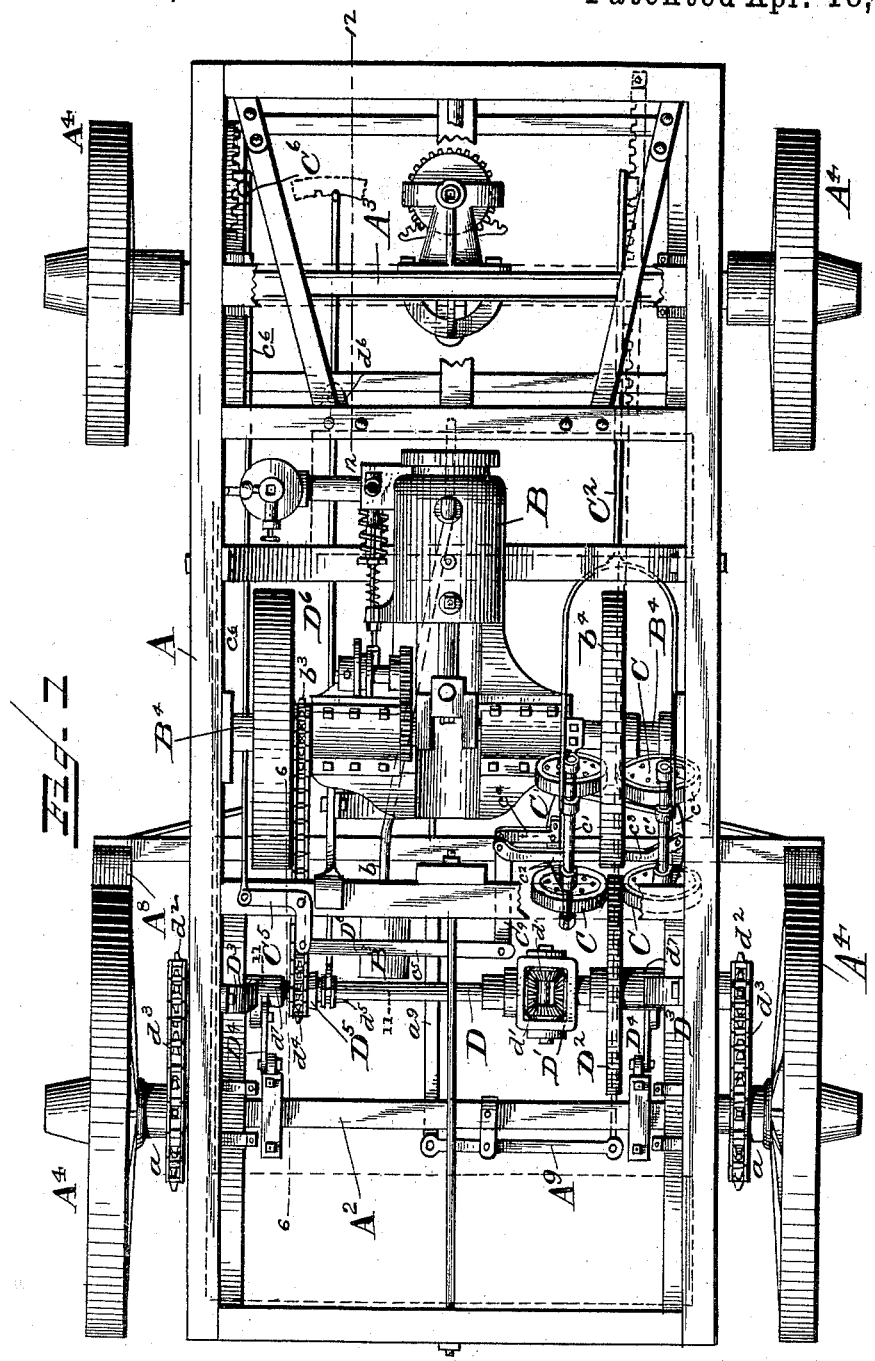

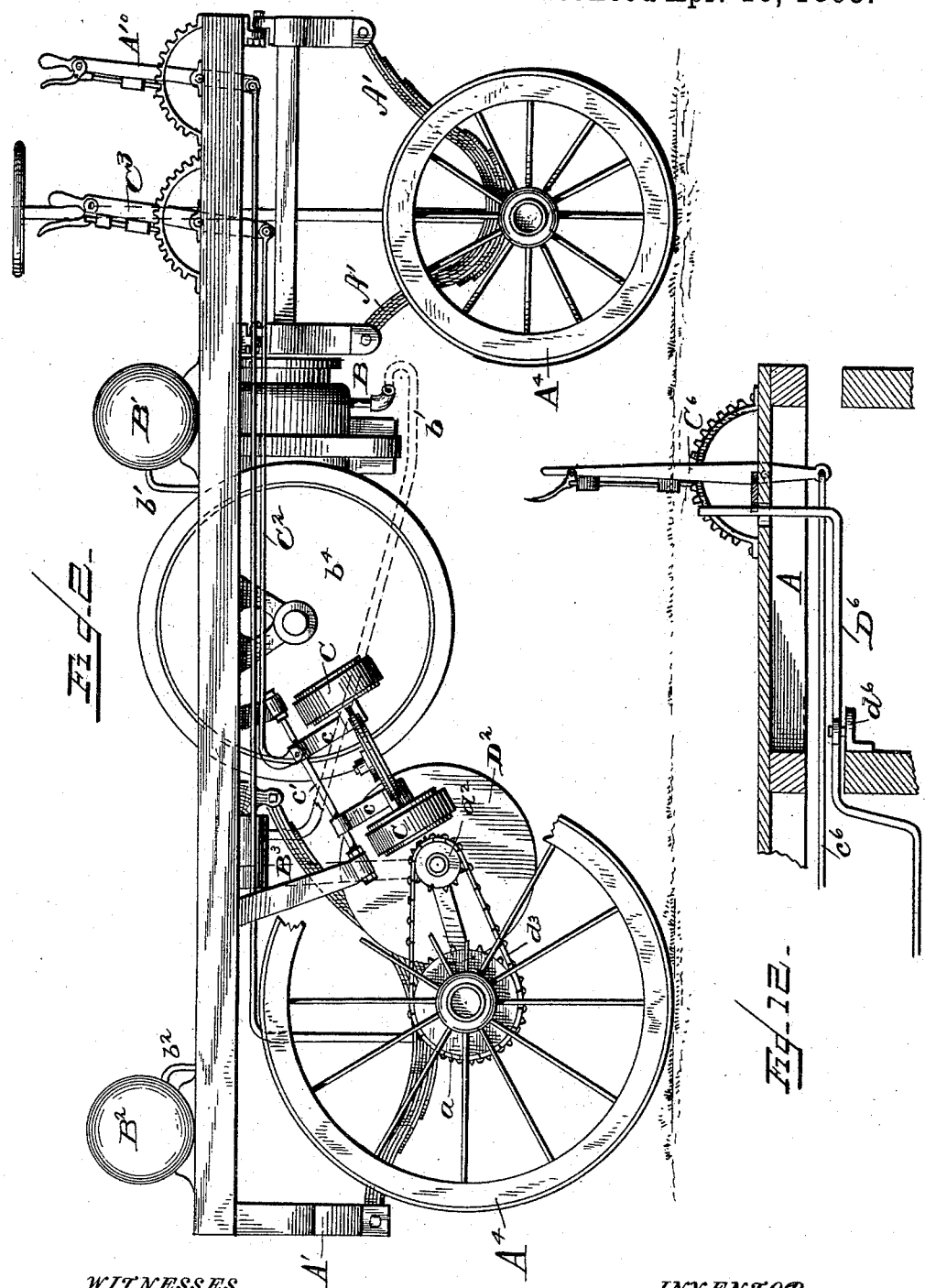

(No Model.)  6 Sheets—Sheet 6.
W. T. HARRIS.
VEHICLE MOTOR.
No. 495,733. Patented Apr. 18, 1893.
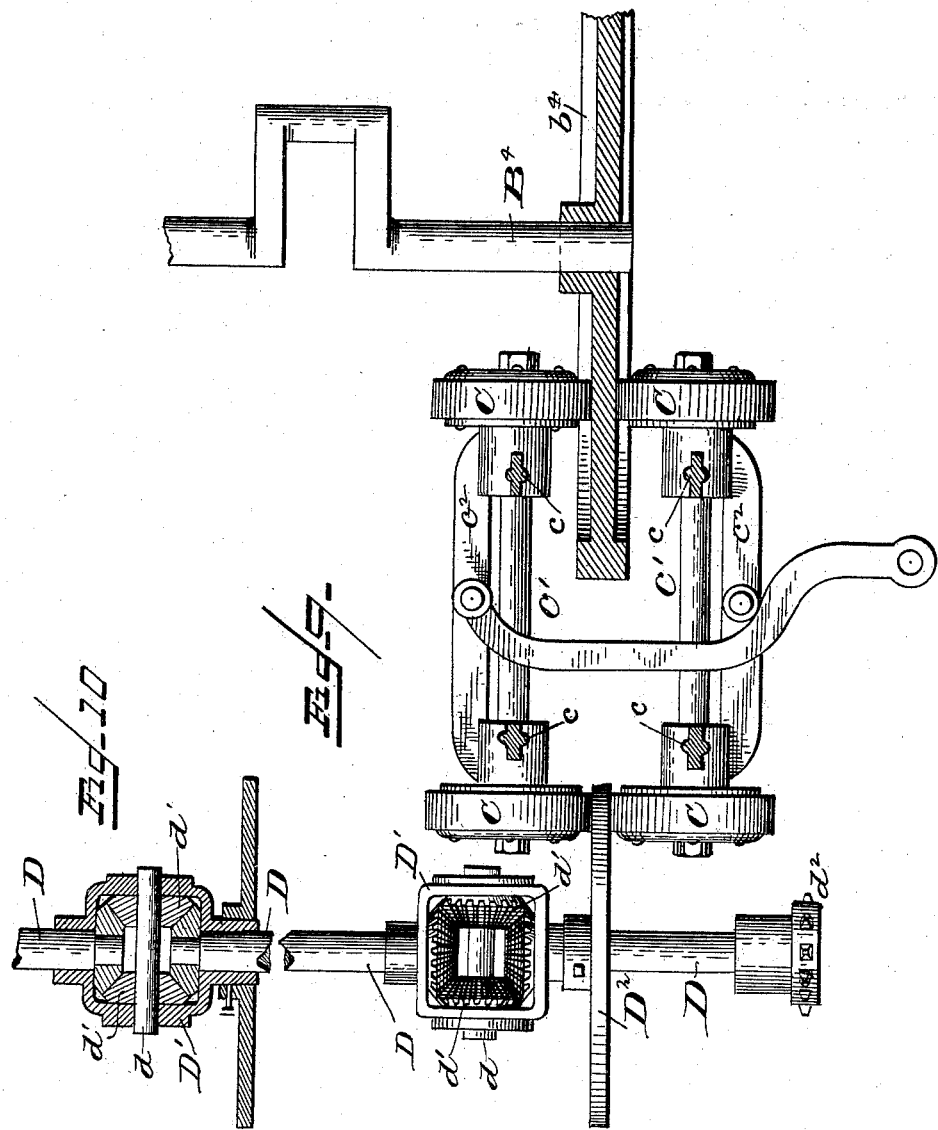
WITNESSES
INVENTOR

UNITED STATES PATENT OFFICE.

WILLIAM T. HARRIS, OF BALTIMORE, MARYLAND, ASSIGNOR OF ONE-EIGHTH TO ERNEST W. BRADFORD, OF INDIANAPOLIS, INDIANA.

VEHICLE-MOTOR.

SPECIFICATION forming part of Letters Patent No. 495,733, dated April 18, 1893.

Application filed April 14, 1892. Serial No. 429,161. (No model.)

*To all whom it may concern:*

Be it known that I, WILLIAM T. HARRIS, a citizen of the United States, residing at Baltimore, in the State of Maryland, have invented certain new and useful Improvements in Vehicle-Motors; and I do hereby declare the following to be a full, clear, and exact description of the invention, such as will enable others skilled in the art to which it appertains to make and use the same.

The object of my said invention is to provide a motor for use in operating vehicles which may be driven by a gasoline or similar engine conveniently supported on the framework or bed of said vehicle, whereby a very inexpensive and at the same time efficient and serviceable motor is provided which may be used on vehicles of all classes, all as will be hereinafter more particularly described and claimed.

Referring to the accompanying drawings which are made a part hereof and on which similar letters of reference indicate similar parts, Figure 1 is a top or plan view of a vehicle equipped with my said invention, all that portion above the framework of the bed being omitted to show the machinery beneath more clearly; Fig. 2 a side elevation of the same; Fig. 3 a front elevation; Fig. 4 a detail sectional view on the dotted line 4 4 in Fig. 3; Fig. 5 a view looking downwardly from the dotted line 5 5 in Fig. 3, showing the front axle and portions of the steering mechanism in top plan; Fig. 6 a detail section looking in the direction indicated by the arrows from the dotted line 6 6 in Fig. 1; Fig. 7 a detail on an enlarged scale of a portion of Fig. 2; Fig. 8 a detail view on an enlarged scale of a portion of Fig. 1 showing the friction gear for transmitting motion from the engine to the driving shaft of the vehicle; Fig. 9 a similar view showing a modified form of gripping device; Fig. 10 a detail sectional view on the dotted line 10 10 in Figs. 8 and 9; Fig. 11 a detail section on the dotted line 11 11 in Fig. 1; and Fig. 12 a detail view looking in the direction indicated by arrows from the dotted line 12 12 in Fig. 1.

In said drawings portions A represent the framework of the vehicle bed and the running gear of the vehicle; B the engine; C friction wheels for transmitting power from the engine to the driving shaft, and D said driving shaft.

The framework A is of suitable construction to form the bed of the vehicle body and support the various mechanisms. It is mounted by means of springs $A'$ upon axles $A^2$ and $A^3$ which have wheels $A^4$ of the desired construction upon their spindles. The rear axle $A^2$ is of an ordinary construction and the wheels thereon have sprocket wheels $a$ upon the inner ends of their hubs. The forward axle $A^3$ has its spindles $a'$ pivoted thereto upon vertical pivots, their inner ends being rigidly connected to longitudinal bars $a^2$ which extend out in each direction therefrom, their outer ends being connected pivotally to transverse connecting bars $a^3$. Said bars $a^2$ and $a^3$ thus form a rectangular frame hinged at its corners and rigidly secured to the spindles at its sides. Extending forward from the center of said axle $A^3$ is a bar $a^4$ connected at its rear end to the center of said axle and at its front end to the center of the front bar $a^3$ by pivotal connections. Said bar is formed as shown in Fig. 4 with an offset or depression therein between the axle and front bar $a^3$, a toothed segment $a^5$ being formed on the shoulder or end of the straight portion. Rigidly secured to said axle and extending forward over said bar $a^4$ is an overhanging frame $A^5$ having a bearing in which is journaled a short vertical shaft $A^{11}$ carrying a spur gear wheel $a^6$ on its lower end. A short shaft $A^6$ with a worm gear in its center and a spur gear on one end is journaled in bearings formed in downwardly hanging ends of portions of said frame $A^5$, said spur gear wheel meshing with the spur gear wheel $a^6$ and the worm gear engaging with the toothed segment. An upright rod $A^7$ with a handle wheel $a^7$ on its upper end is connected to said shaft $A^{11}$ preferably by forming its lower end square and inserting the same in a square socket in said shaft. Said socket is formed deep and the rod $A^7$ is secured from vertical movement on the frame by a detent engaging with a circumferential groove therein as shown in Fig. 4, the vertical motion of the body on the springs being allowed by said deep socket. By this means the vehicle can be easily steered, the hand wheel $a^7$ being stationary and located convenient for the operator, a turn of the same in either direction operating through the worm gear, the toothed segment and the hinged framework to throw the forward wheels as desired. Brake shoes $A^8$ are also provided being mounted on the ends of a cross bar supported upon hangers $a^3$ from the framework, in position to impinge upon the rear wheels of the vehicle when operated. The bar bearing said brake shoes is connected in its center by a rod $a^9$ to a lever $A^9$ pivoted to the rear axle in a suitable housing, a connecting rod $a^{10}$ running from the other end of said lever to an operating lever $A^{10}$ situated in the cab of the vehicle convenient to the operator. Said lever $A^{10}$ is provided with spring pawl adapted to engage with a toothed segment by which it is retained in the desired adjustment in a well known manner.

The engine B may be of any construction desired or found suitable, the one shown being that known as the Vanduzen gas and gasoline engine, which I find from experiment to be well adapted for the purpose. The water tank $B'$ (shown in Fig. 2 and indicated by dotted lines in Figs. 1 and 3) is situated on the framework A under one of the seats, a supply pipe $b'$ running therefrom to within the shell of the engine to supply the water to keep it cool as is usual. The gasoline or gas tank $B^2$ may be located under another of the seats (as shown in Figs. 2 and 4 and indicated by dotted lines in Fig. 1) or in any other convenient location, as on top of the vehicle, a supply pipe $b^2$ running therefrom to the engine for supplying the fluid as required. The detail construction and operation of the engine does not of course need to be described herein, being well known to those familiar with the art. A muffler $B^3$ of a usual form is preferably supported on the vehicle framework with which the exhaust port of the engine is connected by a pipe $b$, which overcomes and deadens the noise caused by the report of the fluid as it explodes in the cylinder. The engine shaft $B^4$ has a sprocket wheel $b^3$ secured thereon near one end which is connected by a sprocket chain to an idler sprocket wheel $d^4$ on the driving shaft D of the vehicle, for a purpose which will be presently described. On the same end it carries the usual fly wheel and on the opposite end has a friction disk $b^4$.

The friction wheels C are arranged in pairs upon opposite ends of short shafts $C'$, which shafts are journaled in suitable bearings in the lower ends of hangers $c$ which are hung from rods $c'$ supported from the frame-work, one on each side of the friction disk $b^4$. Said hangers $c$ for each shaft $C'$ are secured together at the desired distance from each other by connecting bars $c^2$ and at their upper ends are hung upon the rods $c'$ to be slid back and forth and also to swing thereon. To the upper end of the front hinges of each pair is connected one branch of a forked rod $C^2$ which runs forward and is connected to an operating lever $C^3$ similar to the operating lever $C^{10}$. By this means said hangers carrying said friction wheels are adjusted to different positions in relation to the disk $b^4$ and the speed of the vehicle thus regulated, as will be presently described. A rod $c^3$ is pivotally connected to the outside bar $c^2$ and extends in across the inner shaft, and a bar $c^4$ is rigidly secured to the inner bar $c^2$ and also extends inwardly. The inner ends of said bar $c^4$ and said rod $c^3$ being connected to the same end, at short distances from each other, of a short lever $C^4$ which lever is connected by a rod $c^5$ to one arm of a bell crank $C^5$, the other arm of which bell crank is connected by rod $c^6$ to an operating lever $C^6$ in the cab of a construction similar to that of the levers $A^{10}$ and $C^3$. By this means, as will be readily understood, said friction wheels are gripped upon or released from the friction disk $b^4$ and the friction disk of the driving shaft of the vehicle.

The driving shaft D of the vehicle is formed in two parts connected by the frame $D'$, the adjacent ends of said two parts extending to within said frame and have spur gear wheels rigidly secured thereon. A short shaft $d$ extends through said frame $D'$ transversely of the shaft D and has spur gear wheels $d'$ mounted to revolve loosely thereon just within said frame which mesh with the spur gear on the ends of the two members of said shaft D. On the outer hub of said frame $D'$ is rigidly secured a friction disk $D^2$ with which the rear pair of friction wheels C engage, as do the forward pair with the friction disk $b^4$ on the engine shaft. By this means, as will be readily seen, motion is transmitted from said engine to said driving shaft, the revolving of the disk $D^2$ operating to drive the frame $D'$, on the outer hub of which said disk $D^2$ is secured, and through it the shaft D. Said shaft D is journaled in bearings $d^7$ in the lower ends of hangers $D^3$ connected to the framework. Sprocket wheels $d^2$ are provided on the outer ends of said shaft D which are connected by means of sprocket chains $d^3$ with the sprocket wheels $a$ on the inner ends of the hubs of the rear wheels of the vehicle. The lower ends of the hangers $D^3$ and the bearings $d^7$ thereon are supported in the desired relative position to the rear axle by means of links $D^4$ connected therewith at one end and adjustably connected to said axle, as shown in Fig. 6 at the other end. By this means the tension of the chain belts can be adjusted as desired. By means of the compensating gear connecting the two members of the shaft D said two members are permitted to turn independent of each other or in opposite directions, as in turning corners, thus relieving said shaft from the twisting strain which would otherwise be put upon it. Another sprocket wheel $d^4$ is mounted loosely on said shaft D formed with an interior tapered friction surface and the cone pulley $D^5$ is mounted on said shaft, by means of a spline $d^5$, adjacent thereto. Said cone pulley has a hub with a circumferential groove with which a shifting fork on the end of a lever $D^6$ engages. Said lever $D^6$ extends forward to the cab, being pivoted at a suitable point between said shaft and said cab on a vertical pivot $d^6$, its forward end being extended up into said cab in position convenient to be operated. By this means the carriage may be backed, when desired, as said sprocket wheel $d^4$ is connected by the chain belt directly to the sprocket wheel $b^3$ on the engine shaft. Thus, when it is desired to reverse the motion of the vehicle, the grip of the friction wheels C is released and the cone pulley thrown into an engagement which gives the reverse motion to the shaft D, being driven directly from the engine shaft instead of through the intermediate gear.

The operation of my said invention is as follows: The vehicle being equipped with the mechanism described, the engine is started in motion which starts the friction disk $b^4$ and also the idler sprocket wheel $d^4$ on shaft D. Neither the friction wheels C nor the cone pulley $D^5$ being in engagement, no motion is given to the vehicle, but it being desired to start the vehicle forward, the grip lever $C^6$ is operated to throw the two shafts bearing the friction wheels C toward each other, the forward pair of wheels gripping the disk $b^4$ and the rear pair of wheels gripping the disk $D^2$. When first started, the lever $C^3$ is preferably adjusted so that the forward pair of wheels C will engage the disk $b^4$ near its center, and the rear pair of wheels the disk $D^2$ near its periphery. Great power is thus secured as needed in starting, but when once in motion, the speed of the vehicle may be increased by adjusting said lever to move said friction wheels backward, which will push the forward pair toward the periphery of the disk $b^4$, and the rear pair toward the center of the disk $D^2$, thus increasing the speed very rapidly. In climbing hills or in other places where more power is needed, it is quickly and easily secured, as will be readily understood by drawing said wheels forward again, the gearing being so arranged that the slightest movement thereof will make a decided change in the power or speed of the motor. It being desired to stop the vehicle, the lever $C^6$ is operated to release the grip of the friction gear and the brake lever $A^{10}$ is operated to throw the brake shoes against the rear wheels. It being desired to back for any reason, the friction gear wheels C are disengaged and the cone pulley $D^5$ is thrown into engagement with the idler sprocket wheel $d^4$ by means of the lever $B^6$, and the desired result is secured. The vehicle is at all times easily and safely guided through the guiding mechanism, connected with the front wheels, as before described.

By means of this invention a vehicle is provided which can be operated very cheaply, and at the same time, with a great deal of power and at a high rate of speed.

In Fig. 9 I have indicated a modified means for gripping the friction wheels C upon the disks $d^4$ and $D^2$ which will be readily understood from the inspection of said figure. Many other modifications of the details of construction are also obvious, and I do not therefore, limit myself to the exact construction shown and described, but desire to be understood as claiming broadly the leading features of this invention, whereby a gasoline or other suitable engine, may be used as the motive power for vehicles of any kind, and the great advantages of its practical use secured.

Having thus fully described my said invention, what I claim as new, and desire to secure by Letters Patent, is—

1. The combination in a vehicle, of an engine supported on the framework thereof, a friction disk on said engine shaft, the vehicle driving shaft also carrying a friction disk, and intermediate friction gear connecting said two disks and arranged to be adjusted into or out of engagement therewith, substantially as set forth.

2. In a vehicle the combination of the framework and running gear, an engine supported by said framework, a friction disk on the shaft of said engine, a driving shaft geared to the driving wheels of the vehicle and carrying a friction disk, and two pair of friction wheels mounted on short shafts journaled in swinging bearings on each side of said disks, the forward pair of which are arranged to engage with the disk on the driving shaft of the vehicle, and means substantially as described for throwing said friction wheels into and out of engagement with said disks, substantially as set forth.

3. In a vehicle the combination of the framework and running gear, an engine supported by said framework, the gear wheel on the shaft of said engine, a vehicle driving shaft also carrying a gear wheel, and gear wheels mounted upon short shafts in movable bearings on either side of said gear wheels of the engine and driving shafts and means for adjusting them into and out of engagement therewith, substantially as set forth.

4. A vehicle motor consisting of an engine, a friction disk driven by said engine, a driving shaft connected with the driving wheels of the vehicle, a friction disk connected with said driving shaft, a short shaft mounted in swinging bearings on each side of said friction disks carrying a friction wheel on each end, the two wheels upon corresponding ends of said shafts being adapted to engage upon either side of the respective disks and means for operating the same into and out of engagement with said disks, substantially as set forth.

5. In a vehicle the combination of the framework and running gear, an engine supported on said framework, having a friction disk on its shaft, a driving shaft, a friction disk on said driving shaft, and friction wheels mounted upon shafts hung in swinging and sliding bearings on either side of said friction disks, said bearings being connected to a means for adjusting them back and forth whereby the speed of the vehicle may be regulated, substantially as set forth.

6. In a vehicle the combination of the frame and running gear, the engine supported by said frame, the friction disk $b^4$ on the engine shaft, the driving shaft of the vehicle, the friction disk $D^2$ on said driving shaft, the friction wheels C mounted on the shafts $C'$ journaled in suitable bearings hung to swing and to slide on the rods $c'$ on each side of said disks, the gripping mechanism connected with an operating lever, and a rod connected with said bearings and extending to another operating lever for adjusting said bearings and wheels longitudinally on said rods $c'$, all substantially as shown and described and for the purposes specified.

7. In a vehicle the combination of the framework and running gear, an engine supported by said framework, a driving shaft connected with the driving wheels of said vehicle and geared at one point by intermediate gear to the engine for driving said vehicle in one direction, and at another point geared directly to said engine for driving the vehicle in the other direction, suitable shifting mechanism being provided for throwing said respective gears into or out of engagement when desired, substantially as set forth.

8. In a vehicle the combination of the framework and running gear, an engine supported by said framework and geared to the driving wheels of said vehicle, the spindles of the forward axle being pivoted on vertical pivots and connected by a rectangular frame hinged at its corners, the forward bar of which is connected by the bar $a^4$ to the center of the axle, said bar $a^4$ having the segment $a^5$, the shaft $A^6$ having the worm gear engaging with said segment and the spur gear engaging with the spur gear wheel $a^6$ on the shaft $A^{11}$ for operating it, substantially as described for the purposes specified.

In testimony whereof I hereby affix my signature in presence of two witnesses.

WILLIAM T. HARRIS.

Witnesses:
  E. W. BRADFORD,
  C. G. BERRYMAN.